United States Patent
Gui

(10) Patent No.: US 8,242,998 B2
(45) Date of Patent: Aug. 14, 2012

(54) LIQUID CRYSTAL DISPLAY WITH INFRARED DETECTION LAYER AND REMOTE CONTROL DISPLAY SYSTEM WITH SAME

(75) Inventor: Fei Gui, Shenzhen (CN)

(73) Assignee: Chimei Innolux Corporation, Miaoli County (TW)

( * ) Notice: Subject to any disclaimer, the term of this patent is extended or adjusted under 35 U.S.C. 154(b) by 594 days.

(21) Appl. No.: 12/383,337

(22) Filed: Mar. 23, 2009

(65) Prior Publication Data

US 2009/0237344 A1 Sep. 24, 2009

(30) Foreign Application Priority Data

Mar. 21, 2008 (TW) .............................. 97110103 A

(51) Int. Cl.
*G09G 3/36* (2006.01)
(52) U.S. Cl. .......................... 345/92; 345/104
(58) Field of Classification Search .................. 345/6–8, 345/92, 104, 156, 173–178, 204, 207, 214; 359/844, 350; 348/118, 59, 766; 257/432, 257/440, E21.614, E21.705; 178/18.09, 178/18.11; 349/106; 356/237.3
See application file for complete search history.

(56) References Cited

U.S. PATENT DOCUMENTS

| | | | | |
|---|---|---|---|---|
| 4,555,720 A | * | 11/1985 | Readhead | 257/440 |
| 4,611,245 A | * | 9/1986 | Trias | 348/766 |
| 4,625,389 A | * | 12/1986 | Readhead | 438/67 |
| 5,045,643 A | * | 9/1991 | Miyabayashi | 178/18.09 |
| 5,209,813 A | * | 5/1993 | Oshida et al. | 216/59 |
| 5,239,179 A | * | 8/1993 | Baker | 250/338.4 |
| 5,873,003 A | * | 2/1999 | Inoue et al. | 396/51 |
| 6,140,980 A | * | 10/2000 | Spitzer et al. | 345/8 |
| 6,558,008 B1 | * | 5/2003 | Salerno et al. | 353/122 |
| 7,330,745 B2 | * | 2/2008 | Kawasaki et al. | 600/310 |
| 7,581,852 B2 | * | 9/2009 | Kennedy et al. | 362/253 |
| 7,973,922 B2 | * | 7/2011 | Matsui | 356/237.3 |
| 2005/0017956 A1 | | 1/2005 | Mai | |
| 2006/0109260 A1 | * | 5/2006 | Sui et al. | 345/175 |
| 2006/0114551 A1 | * | 6/2006 | Okada et al. | 359/350 |
| 2006/0206017 A1 | * | 9/2006 | Kawasaki et al. | 600/310 |
| 2007/0109239 A1 | | 5/2007 | den Boer et al. | |
| 2008/0106595 A1 | * | 5/2008 | Yamane et al. | 348/59 |
| 2009/0323051 A1 | * | 12/2009 | Matsui | 356/237.3 |

FOREIGN PATENT DOCUMENTS

| | | |
|---|---|---|
| CN | 1601335 A | 3/2005 |
| CN | 2745078 Y | 12/2005 |
| CN | 1786770 A | 6/2006 |
| TW | 200516474 A | 5/2005 |
| TW | 200722818 A | 6/2007 |

\* cited by examiner

*Primary Examiner* — Prabodh M Dharia
(74) *Attorney, Agent, or Firm* — Bacon & Thomas, PLLC

(57) ABSTRACT

An exemplary liquid crystal display includes a thin film transistor (TFT) substrate, a color filter substrate opposite to the TFT substrate, and a liquid crystal layer sandwiched between the TFT substrate. The color filter substrate includes a plurality of color units and a first infrared detection layer arranged between the color units. The first infrared detection layer is configured to detect infrared light beams irradiating thereon and determine an irradiated position thereof. A remote control display system employing the liquid crystal display is also provided.

8 Claims, 3 Drawing Sheets

LIQUID CRYSTAL DISPLAY WITH INFRARED DETECTION LAYER AND REMOTE CONTROL DISPLAY SYSTEM WITH SAME

CROSS-REFERENCE TO RELATED APPLICATION

This application is related to, and claims the benefit of, a foreign priority application filed in Taiwan as Application No. 097110103 on Mar. 21, 2008. The related application is incorporated herein by reference.

FIELD OF THE DISCLOSURE

The present disclosure relates to a liquid crystal display (LCD) that includes an infrared detection layer, and a remote control display system employing the liquid crystal display.

GENERAL BACKGROUND

Recently, liquid crystal displays that are light and thin and have low power consumption characteristics have been widely used in office automation equipment, video units, and the like. Generally, a liquid crystal display having touch panel function is achieved by stacking a transparent touch panel on a liquid crystal panel. The touch panel mounted on the liquid crystal panel display acts as an interface or a medium for inputting of signals by a user. However, the touch panel of the liquid crystal display generally needs to be physically contacted, i.e. by a person's finger or a touch pen, to utilize touch control function. This may result in an inconvenient operation in some situations, such as large-sized display, teaching classes, or speeches.

What is needed, therefore, is a liquid crystal display that can overcome the described limitations, as well as a remote control display system.

BRIEF DESCRIPTION OF THE DRAWINGS

The components in the drawings are not necessarily drawn to scale, the emphasis instead being placed upon clearly illustrating the principles of at least one embodiment of the present disclosure. In the drawings, like reference numerals designate corresponding parts throughout various views, and all the views are schematic.

DETAILED DESCRIPTION OF PREFERRED EMBODIMENTS

Reference will now be made to the drawings to describe preferred and exemplary embodiments in detail.

Figure 1:
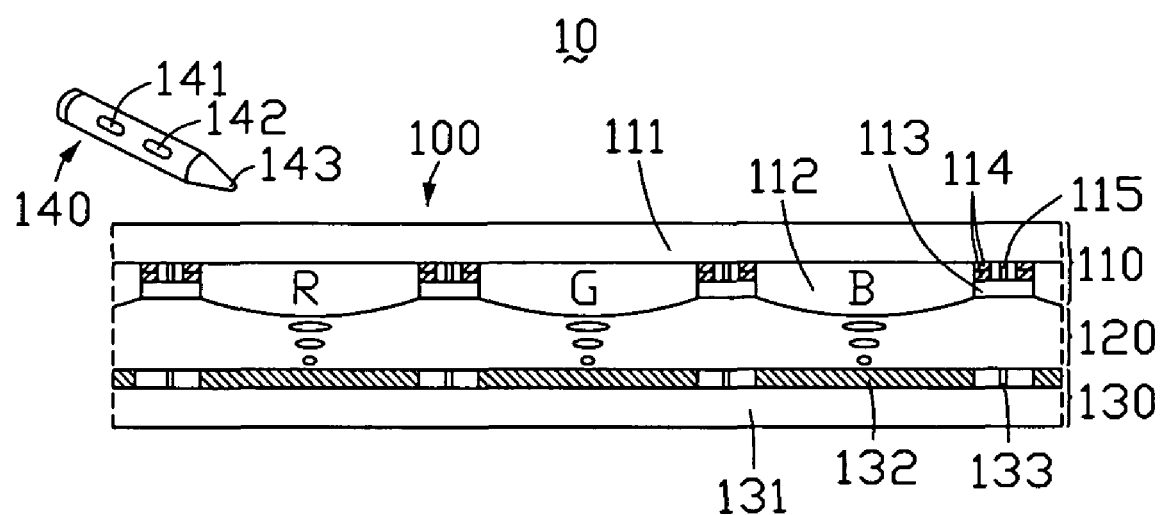
FIG. 1 is a side, cross-sectional view of a remote control display system according to a first embodiment of the present disclosure, the remote control display system including a liquid crystal display and a light beams generator, the liquid crystal display including a thin film transistor (TFT) substrate and a color filter substrate located opposite to each other.

Referring to FIG. 1, a remote control display system 10 according to a first embodiment of the present disclosure is shown. The remote control display system 10 includes a light beams generator 140 configured to generate visible light beams and infrared light beams, and a liquid crystal display 100 configured to display information and detect the infrared light beams from the light beams generator 140.

Figure 2:
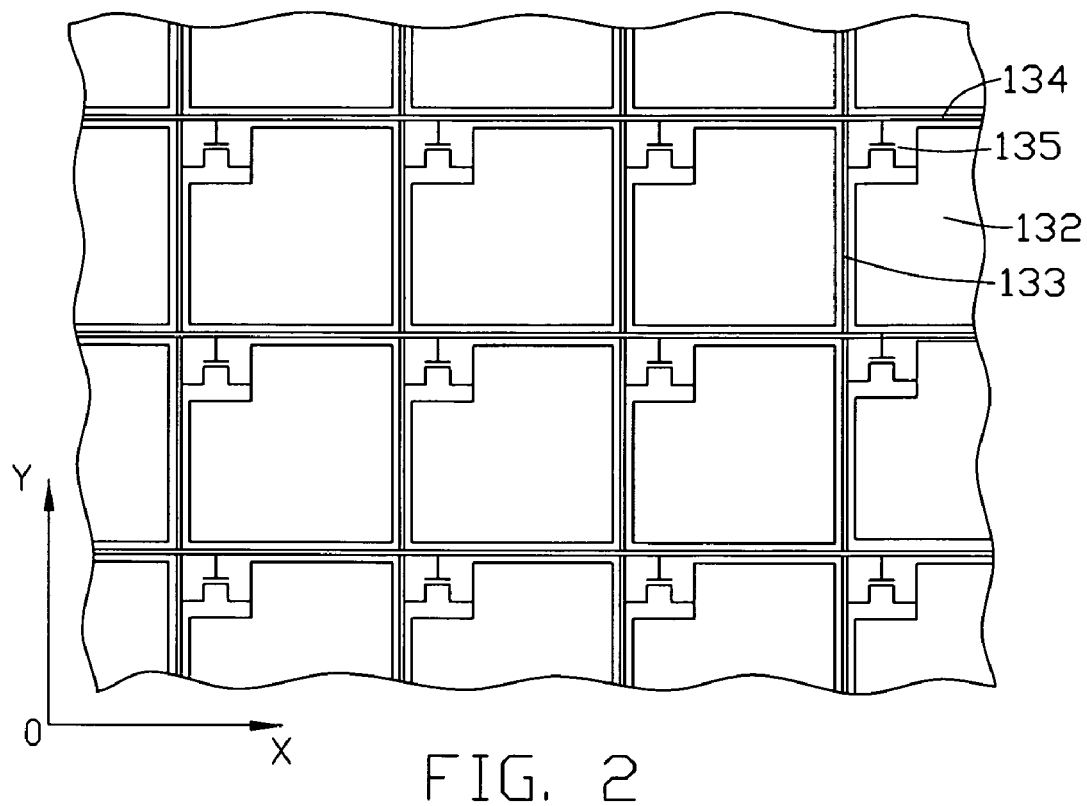
FIG. 2 is a top, plan, partial view of the TFT substrate of the liquid crystal display of FIG. 1.

The liquid crystal display 100 includes a TFT substrate 130, a color filter substrate 110, and a liquid crystal layer 120 sandwiched between the TFT substrate 130 and the color filter substrate 110. Referring also to FIG. 2, the TFT substrate 130 includes a first glass substrate 131, a plurality of display units 132, a plurality of data lines 133, a plurality of scanning lines 134, and a plurality of TFTs 135. The display units 132 are regularly arrayed at the first glass substrate 131. The data lines 133 are parallel to each other, each extending along a first direction. The scanning lines 134 are parallel to each other, each extending along a second direction orthogonal to the first direction. The TFTs 135 function as switching elements, and each is provided in the vicinity of a respective point of intersection of the data lines 133 and the scanning lines 134.

Figure 3:
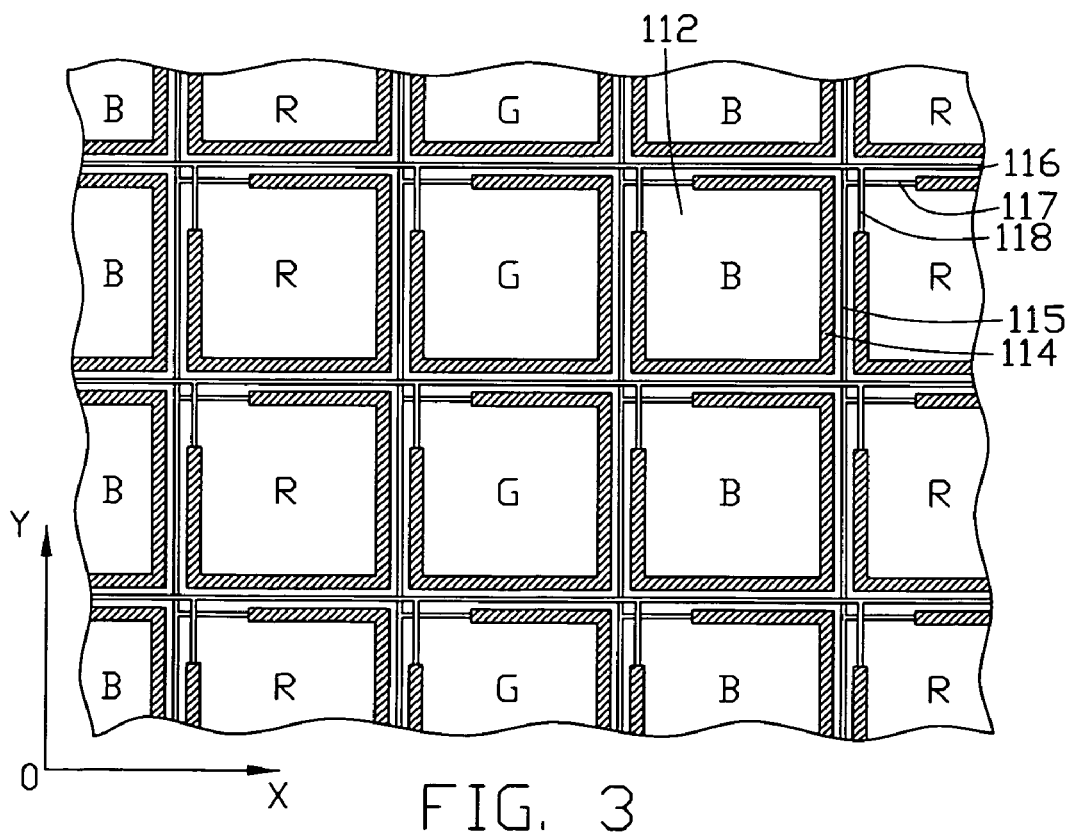
FIG. 3 is a bottom, plan, partial view of the color filter substrate of the liquid crystal display of FIG. 1.

Referring to FIG. 3, the color filter substrate 110 includes a second glass substrate 111, a color filter layer 112, a black matrix 113, an infrared detection layer 114, a plurality of first buses 115, a plurality of second buses 116, a plurality of first leads 117, and a plurality of second leads 118. The color filter layer 112 includes a plurality of red (R), green (G), and blue (B) color units (not labeled) corresponding to the display units 132 of the TFT substrate 130, respectively.

The infrared detection layer 114 is configured to sense infrared light beams. The infrared detection layer 114 is arranged at the second glass substrate 111, and surrounds each color unit, thus defining a plurality of detection blocks (not labeled). The detection blocks correspond to the TFTs 135 of the TFT substrate 130, respectively. The infrared detection layer 114 includes a plurality of P-areas (not labeled) and N-areas (not labeled) doped on the second glass substrate 111, and a plurality of PN-junctions formed between the adjacent P-areas and N-areas.

The first buses 115 and the second buses 116 are arranged at the second glass substrate 111, and are between the infrared detection layer 114. The first leads 117 are connected to the P-areas and the first buses 115. The second leads 118 are connected to the N-areas and the second buses 116. The first buses 115 and the second buses 116 are further connected to an external driving circuit (not shown).

The black matrix 113 covers the infrared detection layer 114, the first buses 115, the second buses 116, the first leads 117, and the second leads 118. The black matrix 113 is configured to absorb light beams passing therethrough and keep the color units separate from each other.

The light beams generator 140 includes a first button 141 configured to control emission of visible light beams, a second button 142 configured to control emission of infrared light beams, and a convex lens 143 configured to focus the visible light beams and the infrared light beams emitting therefrom. By using the convex lens 143, an area irradiated by the visible light beams and the infrared light beams can be controlled to be less than that of one single display unit 132. In operation, the visible light beams are configured to show an irradiated position of the liquid crystal display 100, and the infrared light beams are configured to irradiate the shown position for remote control. In the illustrated embodiment, the light beams generator 140 is a light-generating pen.

For convenience, a Decare coordinate system is induced to describe an operation of the remote control display system 10.

The Decare coordinate system includes an X-axis parallel to the second buses 116, and a Y-axis parallel to the first buses 115. That is, the first bus 115 connected to the irradiated P-area has a defined X-coordinate, and the second bus 116 connected to the irradiated N-area has a defined Y-coordinate. When the first button 141 is pressed, the visible light beams are generated and focused by the convex lens 143. When the P-area and the N-area of the infrared detection layer 114 are irradiated, photogenic charge carriers are generated and result in a measurable voltage. A voltage applied to the first bus 115 connected to the irradiated P-area via the first lead 117 rises, and a voltage applied to the second bus 116 connected to the irradiated N-area via the second lead 118 correspondingly drops. Therefore, the X-coordinate and the Y-coordinate of the irradiated position of the infrared detection layer 114 can be thus determined, and is sent to the external driving circuit via the first and second buses 115, 116. With the determined information of the irradiated position, the external driving circuit can generate correspondingly control signals.

In summary, the visible light beams are generated and irradiate the infrared detection layer 114 to provide a visual guide before the infrared light beams irradiate the infrared detection layer 114, which can provide a reliable remote control. Moreover, there is no need of a touch panel employed in the remote control display system 10, which may provide a light liquid crystal display 100 and avoid use of adhesive.

Figure 4:
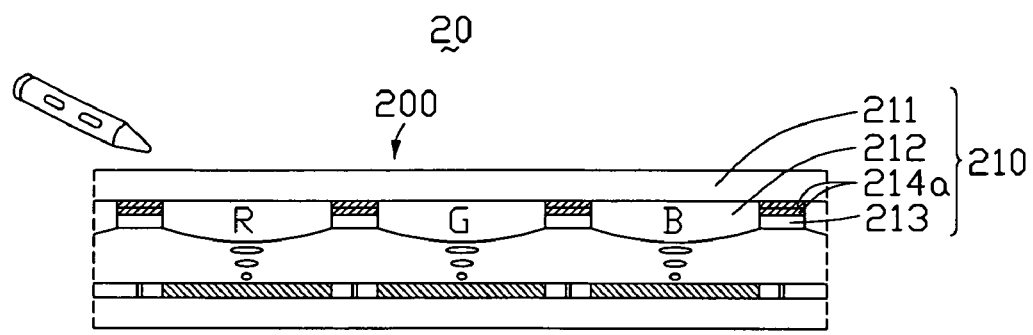
FIG. 4 is a side, cross-sectional view of a remote control display system according to a second embodiment of the present disclosure, the remote control display system including a liquid crystal display having a color filter substrate.
Figure 5:
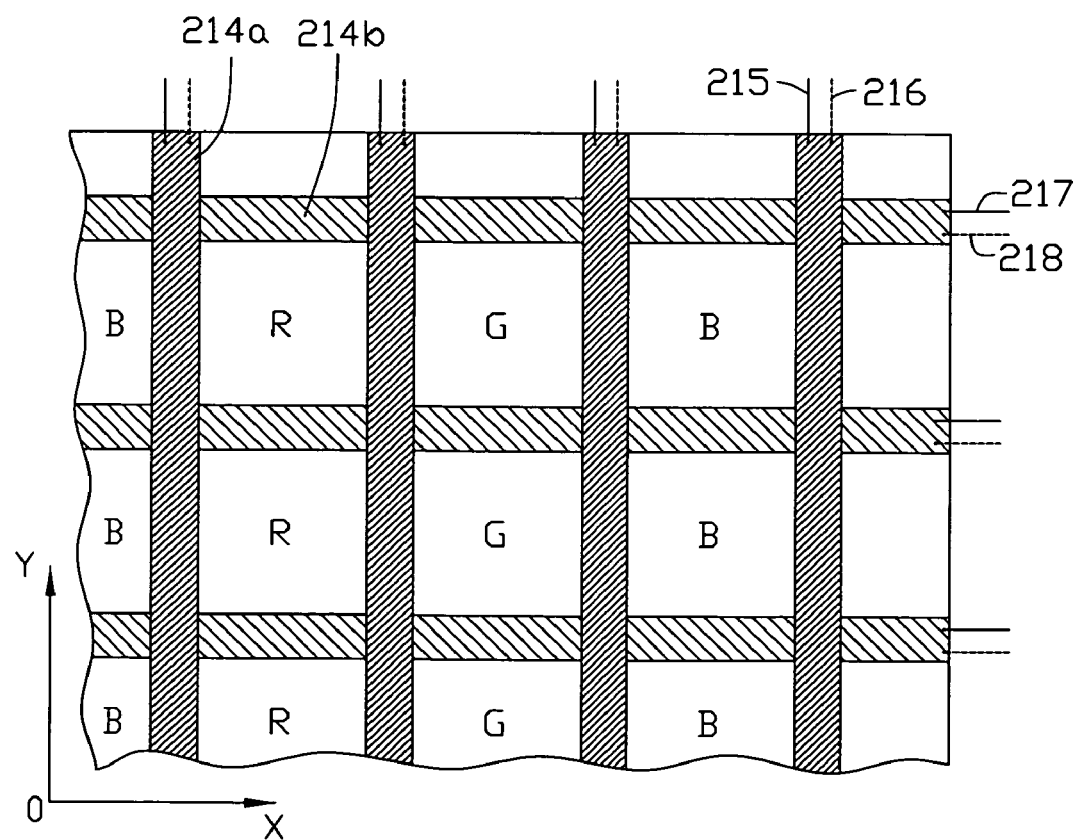
FIG. 5 is a bottom, plan, partial view of the color filter substrate of the liquid crystal display of FIG. 4.

Referring to FIG. 4 and FIG. 5, a remote control display system 20 according to a second embodiment of the present disclosure is shown. The remote control display system 20 is similar to the remote control display system 10 of the first embodiment except a color filter substrate 210 of a liquid crystal display 200 thereof. The color filter substrate 210 includes a glass substrate 211, a color filter layer 212, a first infrared detection layer 214a, a second infrared detection layer 214b, a plurality of first buses 215, a plurality of second buses 216, a plurality of third buses 217, and a plurality of fourth buses 218. The color filter layer 210 includes a plurality of red, green, and blue color units (not labeled) regularly arranged at the glass substrate 211. The first infrared detection layer 214a covers portions of the glass substrate 211 extending along a first direction between the color units. The second infrared detection layer 214b covers portions of the glass substrate 211 extending along a second direction orthogonal to the first direction between the color units. Each of the first infrared detection layer 214a and the second infrared detection layer 214b includes a plurality of P-areas and N-areas. An insulate layer (not shown) is arranged between each cross portion of the first and second infrared detection layers 214a, 214b.

Terminals of the first infrared detection layer 214a are connected to the first buses 215 and the second buses 216, respectively. Terminals of the second infrared detection layer 214b are connected to the third buses 217 and the fourth buses 218, respectively. The first buses 215 and the third buses 217 are connected to the P-areas of the first and second infrared detection layers 214a, 214b. The second buses 216 and the fourth buses 218 are connected to the N-areas of the first and second infrared detection layers 214a, 214b. The first, second, third and fourth buses 215, 216, 217, 218 are connected to an external driving circuit (not shown). The color filter substrate 210 further includes a black matrix layer 213 covers the first and second infrared detection layer 214a, 214b.

The remote control display system 20 can be operated similar to the remote control display system 10. For convenience, a Decare coordinate system is induced to describe an operation of the remote control display system 20. When the color filter substrate 210 is irradiated by infrared light beams, a first coordinate is defined by the first infrared detection layer 214b, and a second coordinate is defined by the second infrared detection layer 214b. A voltage difference between the first and second infrared detection layers 214a, 214b is thus generated, and is sent to the external driving circuit. Therefore, the irradiated position of the liquid crystal display 200 can be determined. With the determined information of the irradiated position, the external driving circuit can generate correspondingly control signals. The remote control display system 20 can achieve advantages similar to those of the remote control display system 10.

Further or alternative embodiments may include the following. In one example, the visible light beams not only irradiate the liquid crystal display 100 to provide a visual guide before the infrared light beams irradiate the infrared detection layer 114, but also irradiate the liquid crystal display 100 to identify the irradiated position after the infrared light beams irradiate the infrared detection layer 114. Therefore, an improved accurate control of the remote control display system 10 can be achieved. In another example, the area irradiated by the visible light beams and the infrared light beams of the infrared detection layer 114 is greater than that of one single display unit 132.

It is believed that the present embodiments and their advantages will be understood from the foregoing description, and it will be apparent that various changes may be made thereto without departing from the spirit or scope of the disclosure or sacrificing all of its material advantages, the examples hereinbefore described merely being preferred or exemplary embodiments of the disclosure.

What is claimed is:

1. A liquid crystal display, comprising:
a thin film transistor (TFT) substrate;
a color filter substrate opposite to the TFT substrate; and
a liquid crystal sandwiched between the TFT substrate;
wherein the color filter substrate comprises a plurality of color units and a first infrared detection layer arranged between the color units, and the first infrared detection layer comprising a plurality of P-areas, N-areas, and PN-junctions formed between the adjacent P-areas and N-areas, a plurality of first buses parallel to each other and extending along the first direction, a plurality of second buses parallel to each other and extending along the second direction perpendicular to the first direction, a plurality of first leads and a plurality of second leads;
wherein, when the P-areas and the N-areas are irradiated by infrared light beams, photogenic charge carriers are generated and result in a measurable voltage, and an irradiated position of the first infrared detection layer where the first infrared beams irradiate on is determined according to the measurable voltage;
wherein, the first infrared detection layer surrounds each of the color units, thereby defining a plurality of detection blocks, and in each detection block, each first lead connected to a corresponding one of the P-areas and a corresponding one of the first buses, and each second lead connected to a corresponding one of the N-areas and a corresponding one of the second buses.

2. The liquid crystal display of claim 1, wherein the color filter substrate further comprising a black matrix layer covering the first infrared detection layer, the first buses, the second buses, the first leads, and the second leads.

3. The liquid crystal display of claim 2, wherein when a position of the first infrared detection layer is irradiated by infrared light beams, corresponding PN-junctions formed between the adjacent P-areas and N-areas at the position of the first infrared detection layer detects the infrared light beams and generate photogenic charge carries on the corresponding PN-junctions, so that a voltage applied to corresponding first buses increases, and a voltage applied to corresponding second buses decreases.

4. A remote control display system, comprising:
an infrared light beams generator configured for providing infrared light beams; and
a liquid crystal display comprising:
a TFT substrate;
a color filter substrate opposite to the TFT substrate; and
a liquid crystal layer sandwiched between the TFT substrate;
wherein the color filter substrate comprises a plurality of color units and a first infrared detection layer arranged between the color units, and the first infrared detection layer comprising a plurality of P-areas, N-areas, and PN-junctions formed between the adjacent P-areas and N-areas, a plurality of first buses parallel to each other and extending along the first direction, a plurality of second buses parallel to each other and extending along the second direction perpendicular to the first direction, a plurality of first leads and a plurality of second leads;
wherein, when the P-areas and the N-areas are irradiated by infrared light beams, photogenic charge carriers are generated and result in a measurable voltage, and an irradiated position of the first infrared detection layer where the first infrared beams irradiate on is determined according to the measurable voltage;
wherein, the first infrared detection layer surrounds each of the color units, thereby defining a plurality of detection blocks, and in each detection block, each first lead connected to a corresponding one of the P-areas and a corresponding one of the first buses, and each second lead connected to a corresponding one of the N-areas and a corresponding one of the second buses.

5. The remote control display system of claim 4, wherein the infrared light beams generator further provides visible light beams for irradiating the first infrared detection layer to provide a visual guide before the infrared light beams irradiate the first infrared detection layer.

6. The remote control display system of claim 4, wherein the color filter substrate further comprising a black matrix layer covering the first infrared detection layer, the first buses, the second buses, the first leads, and the second leads.

7. The remote control display system of claim 6, wherein when a position of the first infrared detection layer is irradiated by infrared light beams, corresponding PN-junctions formed between the adjacent P-areas and N-areas at the position of the first infrared detection layer detects the infrared light beams and generate photogenic charge carries on the corresponding PN-junctions, so that a voltage applied to corresponding first buses increases, and a voltage applied to corresponding second buses decreases.

8. The remote control display system of claim 4, wherein in each detection block, the first infrared detection later comprises two sections parallel to each other and extending along the second direction so as to form a structure to surround a corresponding one of the color units.

\* \* \* \* \*